May 5, 1953 — H. R. KLINK — 2,637,624
GRAIN STERILIZING DEVICE
Filed Jan. 16, 1948 — 3 Sheets-Sheet 1

INVENTOR.
Herbert R. Klink,
BY Victor J. Evans & Co.
ATTORNEYS

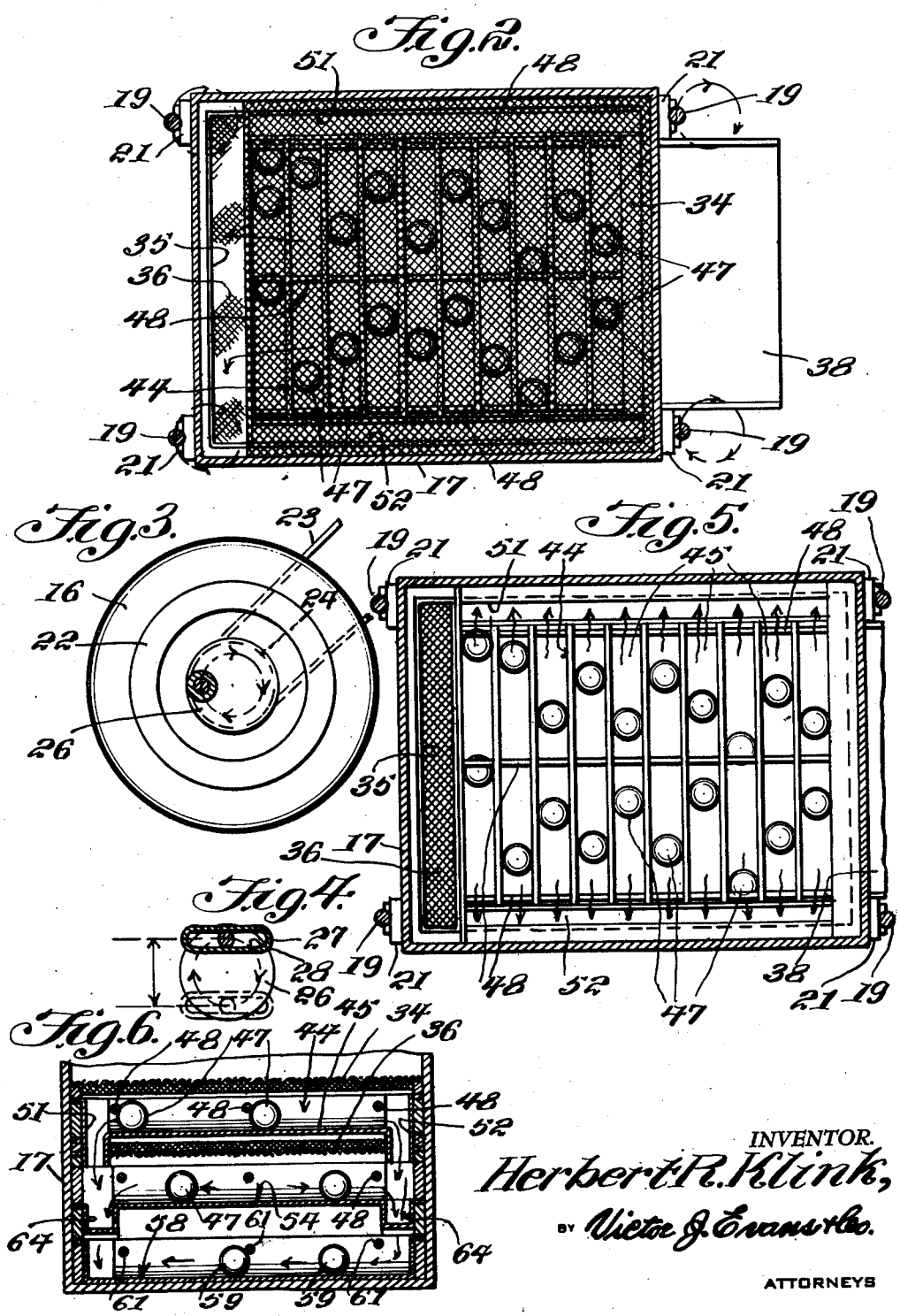

May 5, 1953 H. R. KLINK 2,637,624
GRAIN STERILIZING DEVICE
Filed Jan. 16, 1948 3 Sheets-Sheet 3
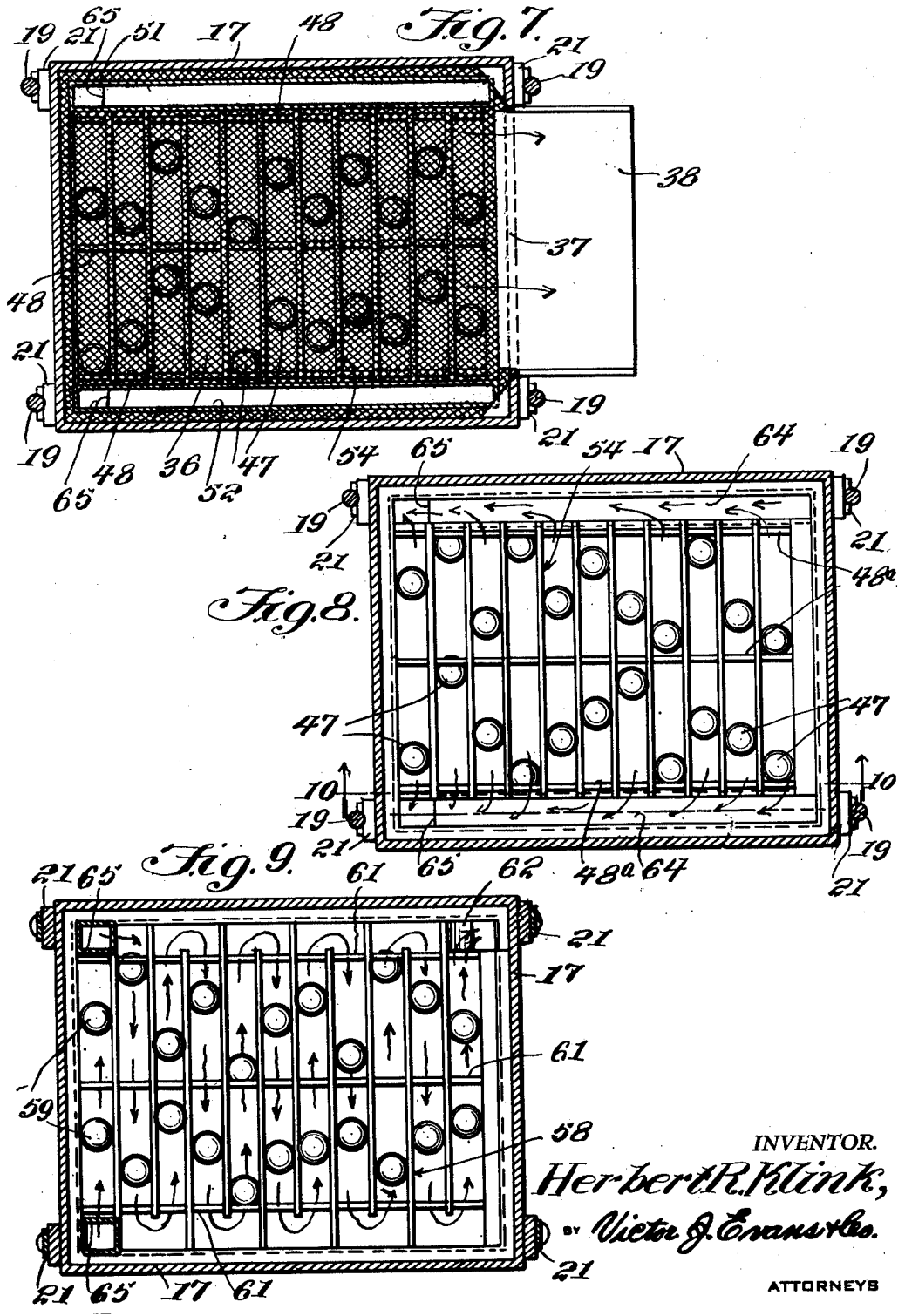
INVENTOR.
Herbert R. Klink,
BY Victor J. Evans & Co.
ATTORNEYS Patented May 5, 1953

2,637,624

UNITED STATES PATENT OFFICE 2,637,624

GRAIN STERILIZING DEVICE

Herbert R. Klink, Roanoke, Va.

Application January 16, 1948, Serial No. 2,760

6 Claims. (Cl. 21—91)

This invention relates to a grain sterilizing process and the apparatus for effecting the same.

It is an object of the present invention to provide a sterilizing process and apparatus wherein the insects can be removed from grain upon the passing of the grain over a screen and wherein these insects, when once separated from the grain, will be crushed so that their return to the grain throughout the continuation of the grain through the apparatus will be prohibited and wherein the grain and the insects will be separately discharged into vessels and wherein the agitating device for the screening of the grain serves also to effect the motion of ball weights serving to crush the insects as they are collected.

Other objects of the present invention are to provide a simple process for separating insects from grain and a simple apparatus for the same, which is easy to operate, inexpensive to manufacture and efficient in operation.

For other objects and for a better understanding of the invention, reference may be had to the following detailed description taken in connection with the accompanying drawing, in which Fig. 1 is an elevational view with portions broken away and shown in section to show the interior of the apparatus.

Figs. 2 and 3 are respectively transverse sectional views taken on lines 2—2 and 3—3 of Fig. 1.

Fig. 4 is a sectional view of a drive to provide back and forth motion.

Fig. 5 is a transverse sectional view taken on line 5—5 of Fig. 1.

Fig. 6 is a sectional view, in elevation, taken on line 6—6 of Fig. 1.

Fig. 7 is a transverse sectional view taken on line 7—7 of Fig. 1.

Figures 1, 10:
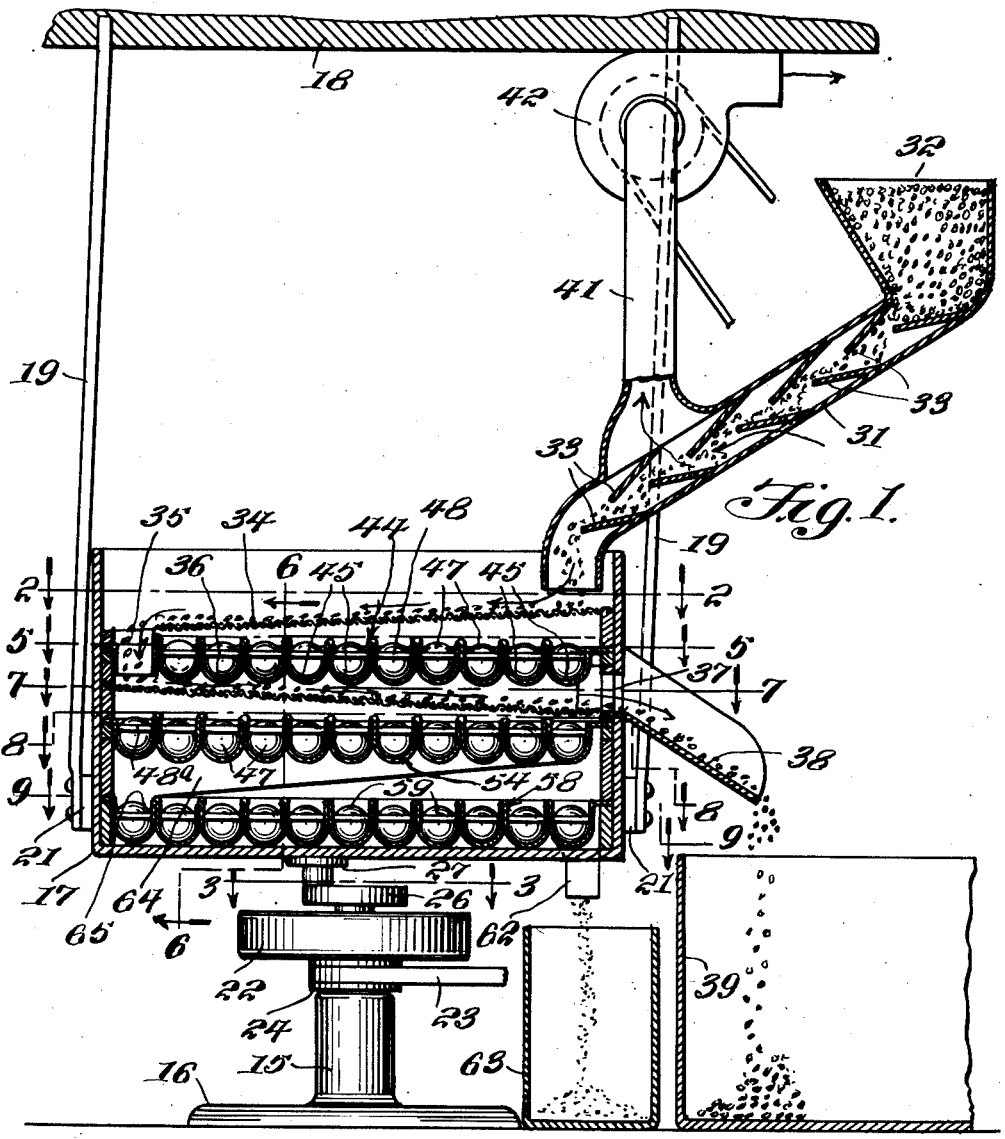

Figs. 8 and 9 are respectively transverse sectional views taken respectively on lines 8—8 and 9—9 of Fig. 1.

Fig. 10 is a sectional view taken on line 10—10 of Fig. 8.

Referring now to the figures, 15 represents a pedestal having a base portion 16 for supporting the apparatus from the floor or a part thereof which serves as the means for effecting motion to a vessel 17 suspended from a ceiling 18 by flexible supporting members 19 connected to the container 17 at the opposite sides thereof as indicated at 21. On the pedestal is a rotatable fly wheel 22 adapted to be driven by a belt 23 extended to any rotary motion source and extended over a pulley 24. At the top of the fly wheel there extends a crank wheel 26 which has a pin extending into a coupling member 27 fixed to the bottom of the container 17. As the crank wheel 26 is turned, the container 17 will be given a circular or gyratory motion. If the member 27 is provided with a slot 28 and shown in Fig. 4, the container will be given straight back and forth motion.

Extending above the vessel 17 and from one side thereof is a chute 31 having a large funnel opening 32 into which grain to be cleaned is extended. Within the chute 31 are a series of staggered baffles 33 over which the grain passes under gravity to the lower end of the chute to be dropped onto a top screen 34 which is of a mesh such as to retain the grain particles but will allow the small insects to be sifted through the same. The screen mesh which is used is between 10 and 14 openings per linear inch. This screen 34 is arranged to have a slight pitch from one side toward an opening 35 at the opposite side through which the grain may fall for travel over a reversely arranged screen 36. This last screen extends to an opening 37 at the first side of the container where the clean grain will be discharged over a chute 38 to a vessel 39 on the floor.

Extending upwardly from the chute 31 is a tube 41 connected with a blower 42 from which dust and chaff taken out of the grain as it descended through the chute 31 is blown.

As the grain travels downward over the screen 34 most insects thereon drop through the screen onto a tray 44 having a plurality of transverse channels 45 therein and freely rotatable balls 47 in the channels crush the insects. The gyratory motion of the container causes the balls to roll back and forth in the channels between the resilient cross bars 48. This motion also causes the insects to travel toward the sides where they drop through open channels 51 and 52, and as noted in Figure 6, they drop from the channels 51 and 52 to sloping troughs 64, which are shown in detail in Figure 10.

As the grain continues to travel over the screen 36 additional insects drop therethrough into another series of channels 54 which are also provided with freely rotatable balls and resilient stops 48a that limit the movement of the balls. The insects that drop into the channels 54 also travel toward the sides and drop into the troughs 64 from which they drop through chutes 65 into a bottom tray 58 having alternately disposed channels with balls 59 therein. The balls 59 are also free to travel in the channels between the resilient stops 61. The gyratory action will cause the insects to travel along one channel and back in the next channel, and this motion is continued until the insects and other foreign matter deposited in the tray reach the far end of the tray where they drop through a chute 62 into a container 63. Insect powder may be introduced into the container 63 for killing insects that may still be alive.

With the parts arranged in this manner the continuous shaking of the device causes the insects to drop through the screens and also causes the rollers to travel back and forth, and as the rollers or balls are metal or made of a comparatively heavy material the insects will be crushed by impact of the balls with the rounded lower portions of the channels.

It will be understood that modifications may be made in the design and arrangement of the parts without departing from the spirit of the invention.

I claim:

1. A device for separating insects from grain comprising a container, a crank means for causing the container to be gyrated, a screen disposed at the top of the container for receiving the grain with the insects therein, said screen being adapted to pass the insects, an insect-destroying means lying beneath the screen to receive the insects, said insect-destroying means including imperforate channel slots, and ball weights traversing said slots to crush the insects therein, said balls being rolled through the channel slots as a result of the motion of the container, said channel slots being shaped for conforming engagement by said rolling balls.

2. An apparatus for separating insects from grain comprising a container, means adapted to suspend the container from an elevated location, means connected to the container to give to the same a gyratory action, a screen in the top of the container, means for delivering grain with the insects therein to one side of the screen, insect-destroying means below the screen, a second screen below the insect-destroying means for receiving grain from one end of the top screen after a certain amount of the insects have been taken therefrom, other insect-destroying means being located below the second screen to receive other insects and to destroy the same, said insect-destroying means comprising imperforate channel portions adapted to receive the insects and ball weights operable through the channel portions to crush the insects and stop means extending across the channel portions to limit the movement of the ball weights, said channel portions being shaped for conforming engagement by said ball weights.

3. An apparatus for separating insects from grain and for destroying the same as defined in claim 2, and further insect-destroying means disposed beneath the second mentioned insect-destroying means and comprising channel portions adapted to receive material from both the first and second-mentioned channel portions, ball weights operable within the third-mentioned channel portions to crush insects in said received material, said third-mentioned channel portions being arranged to provide a circuitous path for the said material along the channel portions and for the delivery of the said material to one end thereof, said channel portions being imperforate and being shaped for conforming engagement by said ball weights and an outlet chute portion for receiving the said material at one end of the third-mentioned channel portions.

4. In an insect remover for grain and the like, a screen box, a plurality of alternately sloping screens positioned in said screen box to retain grain and pass insects, insect receiving surface means below the screens, rolling means on said surface means for crushing insects, insect receiving sloping troughs on opposite sides of the surface means, means feeding grain to the said screen box, and means shaking the said screen box, said receiving surface means being imperforate and being shaped for conforming engagement by said rolling means.

5. In an insect remover for grain and the like, a screen box, a slightly inclined screen spaced from the upper end of the box and with the lower edge of the screen spaced from the end of the box providing a well for receiving grain from the screen, a second slightly inclined screen sloping in a direction opposite to that of the former screen and with the high end thereof positioned to receive grain dropping through the well at the end of the former screen, said screens being adapted to retain grain and pass insects, insect receiving surface means below the screens, rolling means on said surface means for crushing insects, means for receiving crushed insect material from said surface means, means feeding grain to the screen box, and agitating means for shaking the screens, said receiving surface means being imperforate and being shaped for conforming engagement by said rolling means.

6. In an insect remover for grain and the like, screen means adapted to receive insect contaminated grain and having a mesh to pass the contaminating insects while retaining the grain on the screen, means for shaking the screen means to effectuate separation of insects by passage therethrough, means for conducting the grain away from the screen means after separation of insects therefrom, and insect receiving means disposed beneath the screen means, including means for destroying the received insects, said insect-receiving means comprising imperforate surface means beneath the screen means, and said destroying means comprising rolling means on said surface means for crushing insects received on the latter, said surface means being shaped for conforming engagement by said rolling means.

HERBERT R. KLINK.

References Cited in the file of this patent

UNITED STATES PATENTS

| Number | Name | Date |
|---|---|---|
| 1,948,228 | Urban | Feb. 20, 1934 |
| 2,114,494 | Hummel et al. | Apr. 19, 1938 |
| 2,191,923 | Cecka | Feb. 27, 1940 |
| 2,192,076 | Grow | Feb. 27, 1940 |
| 2,226,416 | Simpson et al. | Dec. 24, 1940 |
| 2,339,732 | Smith | Jan. 18, 1944 |
| 2,339,737 | Hulse | Jan. 18, 1944 |